No. 746,480. PATENTED DEC. 8, 1903.
W. A. ENGLAND.
TOBACCO PIPE MOUTHPIECE ATTACHMENT.
APPLICATION FILED FEB. 7, 1903.
NO MODEL.
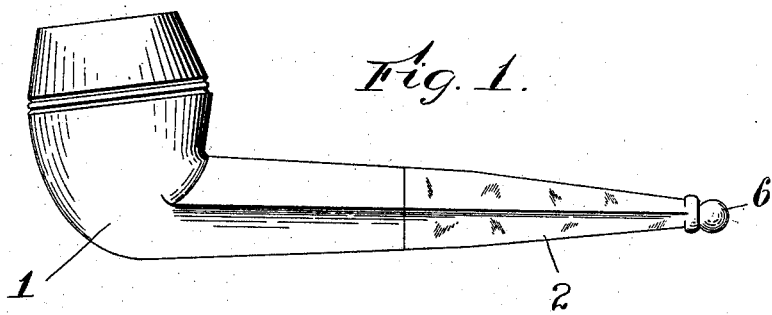
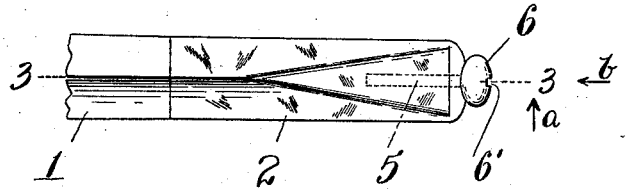
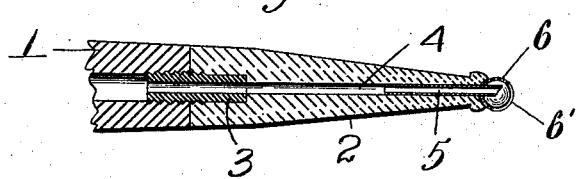
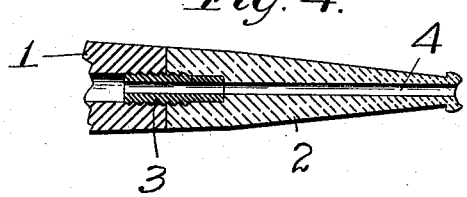
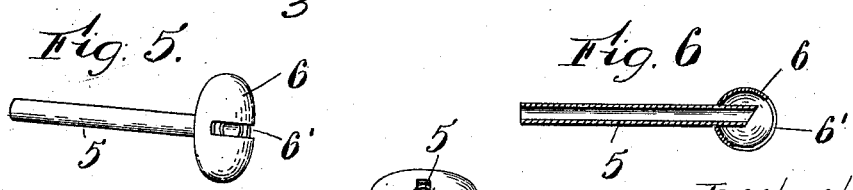
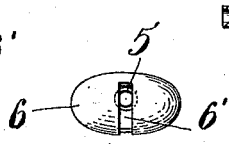
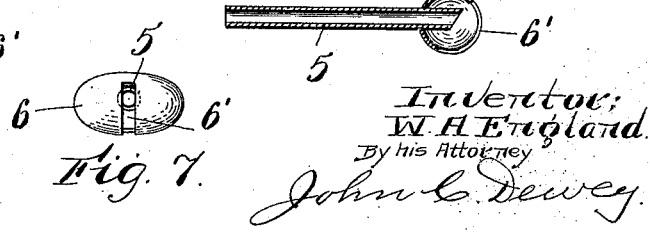
Witnesses:
C. F. Weeson
M. Haas
Inventor:
W. A. England
By his Attorney
John C. Dewey No. 746,480. Patented December 8, 1903.

UNITED STATES PATENT OFFICE.

WILLIAM A. ENGLAND, OF WORCESTER, MASSACHUSETTS.

TOBACCO-PIPE-MOUTHPIECE ATTACHMENT.

SPECIFICATION forming part of Letters Patent No. 746,480, dated December 8, 1903.

Application filed February 7, 1903. Serial No. 142,293. (No model.)

*To all whom it may concern:*

Be it known that I, WILLIAM A. ENGLAND, a citizen of the United States, residing at Worcester, in the county of Worcester and State of Massachusetts, have invented certain new and useful Improvements in Tobacco-Pipe-Mouthpiece Attachments, of which the following is a specification.

My invention relates to a tobacco-pipe, and more particularly to an attachment or device to be combined with the mouthpiece of a tobacco-pipe to keep the pipe clean and sweet and free from nicotin.

The ordinary tobacco-pipe after it has been used for some time becomes foul and the nicotin collects in the lower part of the bowl of the pipe and in the stem and works back through the mouthpiece into the mouth of the smoker.

I am aware that tobacco-pipes have been made with a receptacle to hold the nicotin, and also that numerous devices have been made for removing the nicotin from the pipe.

The object of my invention is to provide a device made separate from the tobacco-pipe and independent thereof and adapted to be combined with and attached to the mouthpiece of any ordinary pipe—for example, a "briar" or a "meershaum"—which will keep the pipe clean and sweet and prevent the formation and accumulation of any nicotin in the pipe, and consequently any foulness of the pipe.

I have discovered that if the saliva from the mouth of the smoker is prevented from passing into the open end of the mouthpiece of a tobacco-pipe when the pipe is being smoked the pipe will always remain clean and sweet no matter how much it is smoked; and my invention consists in a device, to be hereinafter described, adapted to be combined with and attached to the open end of the mouthpiece of a tobacco-pipe to prevent the passage of any saliva or moisture from the mouth of the smoker into the mouthpiece and stem of the pipe to mix with the tobacco and form what is ordinarily termed "nicotin," to foul the pipe.

Referring to the drawings, Figure 1 is a side view of a briar tobacco-pipe having my device attached to the outer end of the mouthpiece. Fig. 2 is a plan view of the mouthpiece and my device, shown in Fig. 1. Fig. 3 is a section on line 3 3, Fig. 2, looking in the direction of arrow *a*, same figure. Fig. 4 corresponds to Fig. 3, but shows the stem and mouthpiece without my device. Fig. 5 is a bottom view of my device detached. Fig. 6 is a sectional view of my device detached corresponding to the view shown in Fig. 3; and Fig. 7 is an end view of the device detached looking in the direction of arrow *b*, Fig. 2. Figs. 5 to 7, inclusive, are shown on an enlarged scale.

In the accompanying drawings, 1 is a tobacco-pipe, which may be of any desired material, shape, and size. 2 is the mouthpiece, made separate from the bowl and stem and attached to the stem by a screw-threaded connector 3, (see Figs. 3 and 4,) as is customary.

An opening 4 extends from the bowl of the pipe through the stem, the connector 3, and the mouthpiece 2 to the outer end of the mouthpiece, where it is enlarged or flared outwardly, as is customary. (See Fig. 4.)

I will now describe my device for keeping the pipe clean and sweet and adapted to be combined with and attached to the mouthpiece of the pipe.

My device is preferably made of metal and of a precious metal, as silver, and consists of a small tube 5, the external diameter of which is a little less than the diameter of the opening 4 through the mouthpiece 2, so that the tube 5 will enter the outer end of the mouthpiece and fit closely in the opening 4 and not be accidentally disconnected therefrom. One end of the tube 5 is preferably cut off straight, and the other end, which extends into and is secured to the enlarged end or head 6, is cut off on a bevel, with the incline toward the mouthpiece 2 and the bottom or lower surface of the head 6. (See Figs. 3 and 6.) The head 6 is hollow and preferably of egg shape, as shown, to fit into the enlarged or flaring end of the opening 4 in the outer end of the mouthpiece. (See Fig. 3.) In the head 6 is an elongated slot or perforations 6', extending through the middle portion transversely of the length of the head and from a point just below the top of the head almost through the bottom of the head, but not as far as the tube 5. (See Fig. 6.) The beveled end of the tube 5 extends through a hole in the head 6 upon the opposite side from the perforation 6' and into the head a distance preferably a little more than half the transverse diameter of the head. The opening in the head 6 for the tube 5 is preferably a little above the center or central portion of the head, and the beveled end of the tube 5 is secured therein by solder or otherwise.

My device is combined with the mouthpiece of the pipe by inserting the tube 5 into the opening 4 in the outer end of the mouthpiece and pushing it in until the head 6 seats itself firmly in the enlarged end of the opening 4, as shown in Fig. 3. The closeness of the fit of the tube 5 in the hole 4 holds my device in place on the mouthpiece 2.

The smoke from the tobacco in the bowl passes through the opening 4 in the stem and mouthpiece 2 and through the tube 5 into the head 6 and out of the perforation 6' therein into the mouth of the smoker, but any saliva or moisture from the mouth of the smoker is prevented from passing into the tube 5 and into the opening 4 in the pipe by the head 6, for it collects in the head 6 and passes back through the perforation 6' therein into the mouth of the smoker, and in this way the pipe is kept clean and sweet.

It will be understood that the details of construction of my device may be varied, if desired—for example, the shape of the head 6 may be changed.

Having thus described my invention, what I claim as new, and desire to secure by Letters Patent, is—

1. A tobacco-pipe-mouthpiece attachment for keeping the pipe clean and sweet comprising a tube adapted to be inserted into the opening at the outer end of the mouthpiece, an enlarged hollow end or head secured to one end of the tube and having a slot or perforation therein extending from a point below the top of the head to the bottom portion thereof, the end of the said tube being extended into the hollow end or head, whereby saliva is prevented from passing into the open end of the mouthpiece.

2. A tobacco-pipe-mouthpiece attachment for keeping the pipe clean and sweet, comprising a tube adapted to be inserted into the opening at the outer end of the mouthpiece, an enlarged hollow end or head secured to one end of said tube and having a slot or perforation transversely thereof and extending in a direction from the upper to the lower portion of the head, the end of said tube being extended into the hollow end or head and having its end cut on a bevel, whereby saliva is prevented from passing into the open end of the mouthpiece.

W. A. ENGLAND.

Witnesses:
J. C. DEWEY,
M. HAAS.